(12) United States Patent
Ruch et al.

(10) Patent No.: US 8,139,348 B2
(45) Date of Patent: Mar. 20, 2012

(54) COVER FOR A DISPLAY

(75) Inventors: Mark H. Ruch, The Woodlands, TX (US); Earl W. Moore, Cypress, TX (US); Steven S. Homer, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 50 days.

(21) Appl. No.: 12/472,566

(22) Filed: May 27, 2009

(65) Prior Publication Data
US 2010/0302720 A1 Dec. 2, 2010

(51) Int. Cl.
G06F 1/16 (2006.01)

(52) U.S. Cl. ........... 361/679.21; 248/288.11; 312/223.5; 345/179; 206/763

(58) Field of Classification Search ............ 361/679.21, 361/679.24, 679.27, 679.06, 679.55–679.57, 361/679.46; 248/918, 923, 159, 425, 288.11, 248/176.1; 312/223.2, 223.5, 237, 223.1, 312/7.2, 60; 348/240.99; 343/702; 40/320; 345/173, 174, 656, 107, 168, 179, 207; 206/765, 206/763, 45.21, 320; 16/340, 221, 322, 338, 16/254, 576
See application file for complete search history.

(56) References Cited

U.S. PATENT DOCUMENTS

| | | | |
|---|---|---|---|
| 5,835,344 A * | 11/1998 | Alexander | 361/679.46 |
| 7,006,170 B2 * | 2/2006 | Inoue | 349/60 |
| 7,227,741 B2 | 6/2007 | Garel et al. | |
| 7,248,463 B2 * | 7/2007 | Bander et al. | 361/679.27 |
| 7,542,052 B2 * | 6/2009 | Solomon et al. | 345/659 |
| 7,755,884 B2 * | 7/2010 | Horiuchi et al. | 361/679.24 |
| 2005/0141245 A1 * | 6/2005 | Sugahara et al. | 362/633 |
| 2005/0285804 A1 * | 12/2005 | Usui et al. | 343/702 |
| 2007/0226069 A1 | 9/2007 | Sanchez et al. | |
| 2010/0026854 A1 * | 2/2010 | Rodriguez et al. | 348/240.99 |
| 2010/0218405 A1 * | 9/2010 | Adams et al. | 40/320 |

* cited by examiner

Primary Examiner — Hung Duong

(57) ABSTRACT

A computer system comprises a base portion, a display housing and a cover. The display housing hingeably couples to the base. The display housing containing a display and the display has a first surface to present images to a user and a second surface opposite the first surface. The display housing completely covers the second surface of the display. The cover attaches to the display housing.

14 Claims, 1 Drawing Sheet

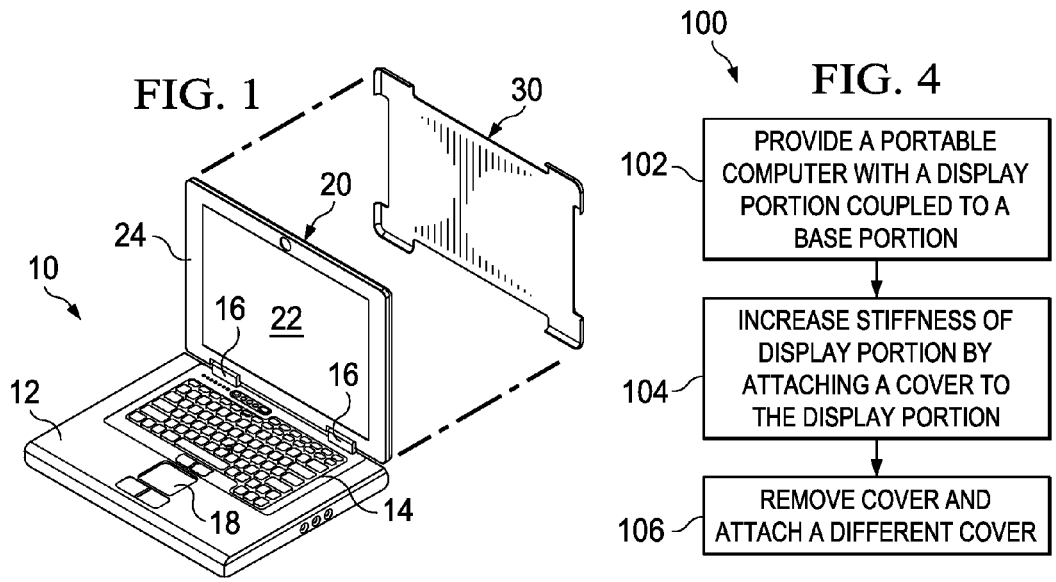
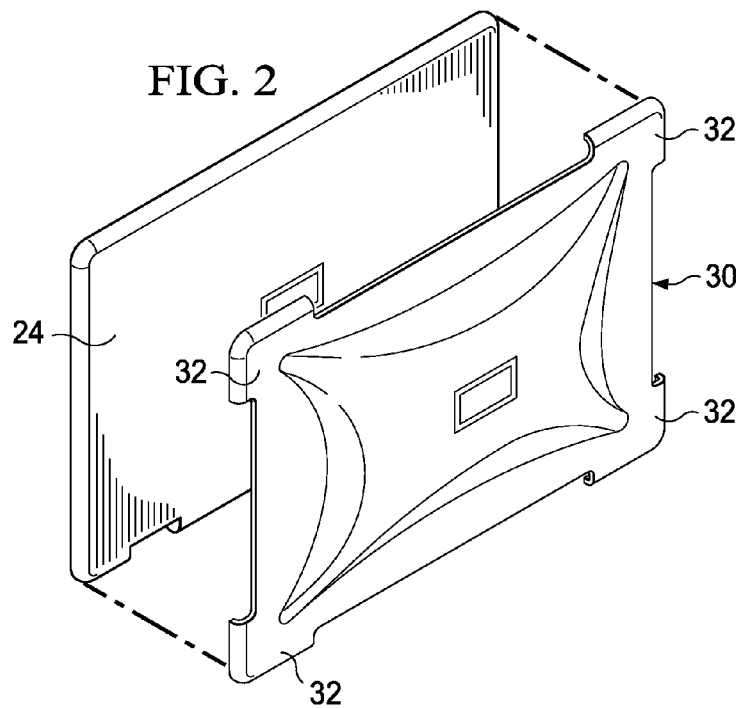
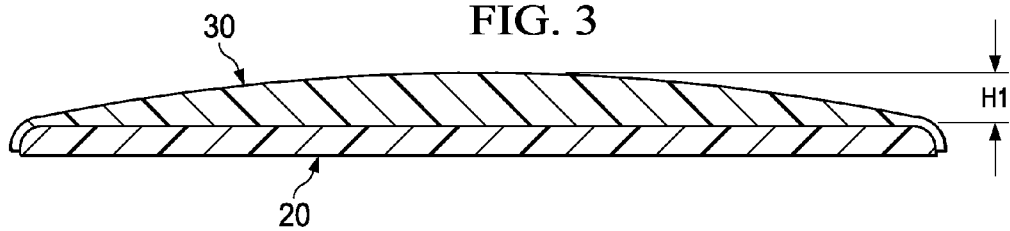

COVER FOR A DISPLAY

BACKGROUND

Portable computing devices, such as notebook computers, are susceptible to being damaged. Users typically close the display lid by pressing down on one corner of the display lid thereby creating a torque on the display lid. Portable computing devices are carried from one place to another, set on desks, laps, and in general are used in such a way that is more likely to lead to damage to the device compared to a stationary desktop system.

BRIEF DESCRIPTION OF THE DRAWINGS

For a detailed description of exemplary embodiments of the invention, reference will now be made to the accompanying drawings in which:

FIG. 1 shows a computer system with a cover that is attachable to the display portion of the computer system in accordance with various embodiments;

FIG. 2 shows a close-up view of the cover and display portion in accordance with various embodiments;

FIG. 3 shows a plan, cut-away view of the cover attached to the display portion in accordance with various embodiments; and FIG. 4 shows a method in accordance with various embodiments.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring to FIG. 1, a computer system 10 is shown in accordance with various embodiments. The computer system 10 shown in FIG. 1 is a portable computer such as a notebook computer. The system 10 comprises a base portion 12 and a display portion 20 hingeably coupled to the base 12. The coupling between the display portion 20 and base portion 12 includes one or more hinges 16. The base portion 12 comprises a housing that includes a keyboard 14 and touchpad 16 as well as electronics such as a processor, memory, etc.

The display portion 20 comprises a display housing 24 which contains a display 22. The display 22 may comprise a liquid crystal display (LCD). The display 22 comprises first and second surfaces. The first surface is the surface that faces the user when the user views information on the display. The second surface of the display 22 is the opposite surface which is not viewable by the user. The display housing 24 completely covers the second, non-viewable surface of the display 22.

FIG. 1 also shows a cover 30 adapted to be attached to the display portion 20. In various embodiments, the cover 30 attaches to the display portion 20, but not the base portion 12. FIG. 2 shows the back side of the display housing 24 (the side that is exposed when the display portion 20 is folded shut on the base portion 12. Cover 30 attaches to the display housing 24 of the display portion 20 to increase the stiffness of the display housing 24.

The computer system 10 can be readily used without the cover. That is, the display housing 24 provides sufficient structural integrity and protection for the display and the housing 24 also provides a sufficient aesthetic appearance. However, with larger displays, the display portion 20 may be more susceptible to being damaged. If that is a concern for the user, a cover 30 can be attached to the display portion 20 to provide additional stiffness to reduce the likelihood that the display portion 20 and display 22 contained therein will be damaged.

The cover 30 may be made from any material that adds sufficient stiffness and structural integrity to the display portion 20. In some embodiments, the cover 30 may be made of plastic, but can be made from other materials such as aluminum, magnesium, etc. In some embodiments, the cover 30 is made from a different material than the display housing 24 to which the cover attaches.

In at least some embodiments, the cover 30 comprises a corner extension 32 at each of the four corners of the cover. Each corner extension 32 functions to increase the stiffness of the cover by supporting the cover in each corner, similar in function to supporting cross beams in scaffolding.

In at least some embodiments, the cover 30 is dome-shaped as depicted in FIG. 3. The domed-shape of the cover 30 provides the display portion 20 with additional stiffness. In some embodiments, the maximum height H1 of the cover is 10 mm inches. The length and width of the cover approximates or matches the length and width of the display housing 24 to which the cover is adapted to be attached. For one example, the cover comprises a stamped piece of aluminum with the dimensions 330 mm×220 mm×10 mm thick. Without the cover, the display housing is caused to deflect by a certain amount upon application of a certain amount of force. In some embodiments, the cover results in twice as much force being applied to result in the same amount of deflection.

In some embodiments, the cover 30 is attached to the display housing 24 by way of adhesive (e.g., double sided adhesive tape). In other embodiments, the cover 30 attaches to the display housing 24 by friction. With friction, the cover 30 can be readily removed to permit a user to use the computer system 10 without the cover, or for the user to attach a different cover 30 to the computer system 10.

In at least some embodiments, a graphic is provided on the exposed outer surface of the cover 30.

FIG. 4 provides a method 100 in accordance with various embodiments. At 102, the method comprises providing (e.g., making, selling, buying, etc.) a portable computer having a display portion hingeably coupled to a base portion. At 104, the method comprises increasing the stiffness of the display portion by attaching a cover (e.g., cover 30) to the display portion. As noted above, the cover may be attached by adhesive or by friction. If attached by friction, then at 106 the cover can be readily removed by a user and a different cover attached to the display portion.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
    a base portion;
    a display housing hingeably coupled to the base, said display housing containing a display, said display having a first surface to present images to a user and a second surface opposite said first surface, said display housing completely covers said second surface of the display; and
    a cover that is attached to the display housing, wherein said cover comprises multiple corners and each corner comprises a corner extension.

2. The computer system of claim 1 wherein said cover is removable by the user and the computer system is usable by the user without said cover.

3. The computer system of claim 1 further comprising adhesive to attach the cover to the display housing.

4. The computer system of claim 1 wherein the cover attaches to the display housing by way of friction.

5. The computer system 1 wherein the cover is made from a different material than the display housing.

6. The computer system of claim 1 wherein the cover has a graphic design thereon.

7. The computer system of claim 1 wherein the cover is dome-shaped.

8. A computer system, comprising:
    a display housing containing a display, said display having a first surface to present images to a user and a second surface opposite said first surface, said display housing completely covers said second surface of the display; and
    a cover that attaches to the display housing, wherein said cover comprises multiple corners and each corner comprises a corner extension.

9. The computer system of claim 8 wherein the cover attaches to the display housing by adhesive.

10. The computer system of claim 8 wherein the cover attaches to the display housing by friction.

11. The computer system of claim 8 wherein the cover is dome-shaped.

12. A method, comprising:
    providing a portable computer containing a display portion coupled to a base portion; and
    increasing stiffness of the display portion by attaching a cover having corner extensions to the display portion.

13. The method of claim 12 further comprising removing said cover and attaching another cover to the display portion.

14. The method of claim 12 wherein attaching the cover comprises applying adhesive to attach the cover to the display portion.

* * * * *

UNITED STATES PATENT AND TRADEMARK OFFICE
CERTIFICATE OF CORRECTION

| | |
|---|---|
| PATENT NO. | : 8,139,348 B2 |
| APPLICATION NO. | : 12/472566 |
| DATED | : March 20, 2012 |
| INVENTOR(S) | : Mark H. Ruch et al. |

It is certified that error appears in the above-identified patent and that said Letters Patent is hereby corrected as shown below:

In column 4, line 1, in Claim 5, after "system" insert -- of claim --.

Signed and Sealed this
Sixth Day of November, 2012

David J. Kappos
*Director of the United States Patent and Trademark Office*